Patented June 4, 1946

UNITED STATES PATENT OFFICE 2,401,614

2,401,614
PRODUCTION OF OIL SOLUTIONS OF ALKALINE EARTH METAL SULPHONATES

Vladimir L. Chechot, Philadelphia, and Llewellyn S. Howe, Drexel Hill, Pa., assignors to The Atlantic Refining Company, Philadelphia, Pa., a corporation of Pennsylvania No Drawing. Application July 21, 1943,
Serial No. 495,798

7 Claims. (Cl. 210—62)

The present invention relates to the production of hydrocarbon oil solutions of alkaline earth metal sulphonates, and more particularly to the preparation and purification of lubricating oil additives comprising a viscous hydrocarbon oil solution of calcium sulphonate.

It has been proposed heretofore to incorporate by various methods "detergents" such as calcium petroleum sulphonate in lubricating oil designed for use in internal combustion engines. In one procedure, oil-soluble sodium sulphonates derived as a by-product in the manufacture of mineral white oil were transposed to calcium sulphonate by treatment with reactive calcium compounds, and the resulting calcium sulphonate was then admixed with lubricating oil. In another procedure, oil-soluble sulphonic acids were isolated from sulphuric acid treated hydrocarbon oil, and the free sulphonic acids in substantially pure condition were added to the lubricating oil and thereafter neutralized with a basic calcium compound to produce calcium sulphonate in the oil. In a third procedure, the hydrocarbon stock was subjected to sulphonation, and after removal of sludge, the resulting hydrocarbon solution of sulphonic acids was neutralized with an aqueous slurry or suspension of hydrated lime. All these methods have been open to objection as involving either unnecessary and uneconomical steps such as the isolation of the free sulphonic acids or their sodium salts and their subsequent transposition to calcium sulphonates, or as in the case of the third procedure mentioned, the difficulties encountered in the formation of emulsions which rendered the method impracticable in commercial operations.

A recently proposed method for the production of oil solutions of calcium sulphonate which obviates the difficulties respecting the formation of emulsions resides in the neutralization of the sulphonated hydrocarbon oil with substantially dry lime. However, while this method avoids troublesome emulsions, the purification of the calcium sulphonate oil solution is rendered difficult due to the high viscosity of the solution on the gelatinous nature of the calcium sulphonate contained in the oil, or a combination of the same as the case may be. During the neutralization of the sulphonated oil, it is necessary to employ lime in a quantity in excess of that required to completely neutralize the oil-soluble sulphonic acids. The resulting oil therefore contains not only the oil-soluble calcium sulphonate, but also unreacted lime, calcium sulphate, and other undesirable solid materials. In most cases, due to the concentration of the calcium sulphonate and its gelatinous nature, the viscosity of the oil is too high to permit essential removal of the solid materials by filtration, except at relatively high temperatures. We have found that this difficulty may be overcome by our method of filtration as is more fully set forth hereinafter.

In accordance with our invention a suitable lubricating oil stock such as a naphthenic oil distillate or a solvent extract fraction obtained by the selective solvent treatment of hydrocarbon oil, is subjected to sulphonation by contacting with a sulphonating agent, e. g., sulphuric acid of high concentration at a temperature sufficiently elevated as to produce maximum sulphonation without excessive loss to acid sludge. Temperatures between 150° F. and 175° F., and preferably between 160° F. and 170° F., using 98 per cent sulphuric acid have been found particularly suitable. The resulting acid sludge is separated from the oil, and to the oil containing oil-soluble sulphonic acids is added powdered hydrated lime in an amount in excess of that required to neutralize the oil, i. e., 3 per cent to 10 per cent excess. The powdered lime is thoroughly dispersed in the oil with vigorous agitation, and the mixture is then heated with open steam at a temperature of 170° F. to 190° F. The steaming is discontinued, and a small amount of water, i. e., 3 per cent to 10 per cent is added to the heated mixture. The mixture is then agitated, preferably by air blowing, for a period of one to two hours, the temperature of the mixture decreasing to 140° F. to 150° F. In this manner neutralization of the oil is obtained without the formation of emulsions which are normally encountered when neutralizing with lime slurry as proposed in the prior art. The mixture, upon completion of the neutralization, is heated preferably by the application of heat from an external source, to a temperature of about 180° F. and is blown with air to remove residual moisture. The oil at this stage contains oil-soluble calcium sulphonate, as well as undesirable solid materials such as calcium sulphate, unreacted lime, and other impurities. Such oil usually has a relatively high viscosity, and if the sulphonation treatment has been unusually severe, the oil may even be gelatinous due to the concentration and nature of the calcium soaps.

In order to reduce the viscosity or to break down the gelatinous structure, and thereby render the removal of solid materials practicable by filtration, we add to the oil a small amount of an organic solvent such as an aliphatic alcohol, a glycol, or a glycol ether. Quantities of solvent of the order of 0.01 per cent to 2.0 per cent have been found satisfactory, although somewhat larger quantities may be used if desired. The solvents which we may utilize include methyl alcohol, ethyl alcohol, propyl alcohol, isopropyl alcohol, the butyl alcohols, the amyl alcohols, ethylene glycol, propylene glycol, butylene glycol, diethylene glycol, mono-methyl ether of ethylene glycol, mono-ethyl ether of ethylene glycol, mono-butyl ether of ethylene glycol, mono-methyl ether of diethylene glycol, mono-ethyl ether of diethylene glycol, and mono-butyl ether of diethylene glycol. Of these compounds, the mono-butyl ether of diethylene glycol is preferred due to its high boiling point and its marked ability to reduce the viscosity of the calcium sulphonate oil solution when used in very minor quantities. When it is desired to maintain a reduced viscosity in the final product, it is advantageous to employ those solvents which have a relatively high boiling point, since there is less tendency for loss due to volatilization. On the other hand, where loss of the solvent from the final product is not disadvantageous, the more volatile solvents such as the lower boiling aliphatic alcohols may be employed.

The oil solution containing oil-soluble calcium sulphonate, solid materials, and organic solvent is heated to an elevated temperature preferably between 120° F. and 180° F., and the mixture is filtered through a medium capable of retaining the solid materials, such as a paper or a cloth filter, and the solid materials are thereby removed from the oil. In order to facilitate the filtration, a small amount of filter aid, such as "Hyflow-Super-Cel" is added to the oil prior to filtration. If it is desired to increase the concentration of calcium sulphonate in the oil, the solution after the filtration step may be subjected to distillation, preferably under reduced pressure, to remove at least a portion of the oil content. The resulting oil, after such concentration procedure, may contain of the order of 20 per cent to 40 per cent by weight of calcium sulphonate. This concentrate may be employed as a base material for blending with lubricating oil of desired viscosity in order to incorporate in the oil the desired amount of calcium sulphonate to function as a "detergent." In the event that it is not desired to remove at least a portion of the oil from the calcium sulphonate oil solution, the distillation step may be eliminated, and the oil may be utilized directly as a lubricant, with or without the addition of other agents such as antioxidants, corrosion inhibitors, film strength agents, and the like.

Our invention may be further illustrated by the following example, which shows the effect of small amounts of mono-butyl ether of diethylene glycol upon the viscosity of calcium sulphonate oil solutions.

| Saybolt Universal viscosity at 210° F. | |
|---|---|
| Original Ca sulphonate oil solution | Ca sulphonate oil solution+0.05% mono-butyl ether of diethylene glycol |
| Seconds | Seconds |
| 418 | 140 |
| 686 | 130 |
| 1040 | 94 |

From the above results, it will be apparent that even a very minor amount of an organic solvent such as a glycol ether is capable of substantially reducing the viscosity of calcium sulphonate oil solutions.

When it is desired to produce oil solutions of sulphonates of the alkaline earth metals other than calcium, we may employ the basic compounds of strontium, barium, and magnesium, utilizing the technique hereinbefore described.

We claim:
1. The method of removing solid materials from an oil solution of an alkaline earth metal sulphonate having relatively poor filtering characteristics, which comprises mixing with said solution an organic solvent from the group consisting of aliphatic alcohols, glycols, and glycol ethers in a small but sufficient amount to lower the viscosity of said solution, and filtering said solution through a filtering medium capable of retaining said solid materials.

2. The method of removing solid materials from an oil solution of an alkaline earth metal sulphonate having relatively poor filtering characteristics, which comprises mixing with said solution an organic solvent from the group consisting of aliphatic alcohols, glycols, and glycol ethers in a small but sufficient amount to lower the viscosity of said solution, and filtering said solution at an elevated temperature through a filtering medium capable of retaining said solid materials.

3. The method of removing solid materials from an oil solution of an alkaline earth metal sulphonate having relatively poor filtering characteristics, which comprises mixing with said solution a filter aid and an organic solvent from the group consisting of aliphatic alcohols, glycols, and glycol ethers in a small but sufficient amount to lower the viscosity of said solution, and filtering said solution at a temperature between 120° F. and 180° F. through a filtering medium capable of retaining said solid materials.

4. The method of removing solid materials from an oil solution of calcium sulphonate having relatively poor filtering characteristics, which comprises mixing with said solution from 0.01 per cent to 2.0 per cent of an organic solvent to lower the viscosity of said solution, said solvent being chosen from the group consisting of aliphatic alcohols, glycols, and glycol ethers, and filtering said solution through a filtering medium capable of retaining said solid materials.

5. The method of removing solid materials from an oil solution of calcium sulphonate having relatively poor filtering characteristics, which comprises mixing with said solution a small amount of mono-butyl ether of diethylene glycol sufficient to lower the viscosity of said solution, and filtering said solution through a filtering medium capable of retaining said solid materials.

6. The method of removing solid materials from an oil solution of calcium sulphonate having relatively poor filtering characteristics, which comprises mixing with said solution from 0.01 per cent to 0.1 per cent of monobutyl ether of diethylene glycol to lower the viscosity of said solution, and filtering said solution at an elevated temperature through a filtering medium capable of retaining said solid materials.

7. The method of removing solid materials from an oil solution of calcium sulphonate having relatively poor filtering characteristics, which comprises mixing with said solution a filter aid and from 0.01 per cent to 0.1 per cent of monobutyl ether or diethylene glycol to lower the viscosity of said solution, and filtering said solution at a temperature between 120° F. and 180° F. through a filtering medium capable of retaining said solid materials.

VLADIMIR L. CHECHOT.
LLEWELLYN S. HOWE.

Certificate of Correction

Patent No. 2,401,614.

June 4, 1946.

VLADIMIR L. CHECHOT ET AL.

It is hereby certified that error appears in the printed specification of the above numbered patent requiring correction as follows: Column 4, line 66, claim 7, for "ether or" read *ether of*; and that the said Letters Patent should be read with this correction therein that the same may conform to the record of the case in the Patent Office.

Signed and sealed this 13th day of August, A. D. 1946.

[SEAL]

LESLIE FRAZER,
*First Assistant Commissioner of Patents.*